US012763324B2

(12) United States Patent
Kim et al.

(10) Patent No.: US 12,763,324 B2
(45) Date of Patent: Oct. 13, 2026

(54) NEGATIVE ACTIVE MATERIAL FOR RECHARGEABLE LITHIUM BATTERY AND RECHARGEABLE LITHIUM BATTERY INCLUDING SAME

(71) Applicant: SAMSUNG SDI CO., LTD., Yongin-si (KR)

(72) Inventors: Hyejin Kim, Yongin-si (KR); Yongseok Kim, Yongin-si (KR); Sojeong Yu, Yongin-si (KR); Kyeu Yoon Sheem, Yongin-si (KR); Jungjoon Kim, Yongin-si (KR); Jaewon Kim, Yongin-si (KR); Jaehou Nah, Yongin-si (KR); Eunjoo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 42 days.

(21) Appl. No.: 18/385,018

(22) Filed: Oct. 30, 2023

(65) Prior Publication Data

US 2024/0170656 A1 May 23, 2024

(30) Foreign Application Priority Data

Nov. 3, 2022 (KR) ........................ 10-2022-0145307

(51) Int. Cl.
*H01M 4/38* (2006.01)
*H01M 4/46* (2006.01)
(Continued)

(52) U.S. Cl.
CPC ........... *H01M 4/386* (2013.01); *H01M 4/466* (2013.01); *H01M 4/485* (2013.01); *H01M 4/583* (2013.01);
(Continued)

(58) Field of Classification Search
CPC ...... H01M 4/386; H01M 4/466; H01M 4/485; H01M 4/583
See application file for complete search history.

(56) References Cited

U.S. PATENT DOCUMENTS

2015/0380733 A1 12/2015 Lee et al.
2018/0269475 A1* 9/2018 Oh ...................... H01M 4/0428
(Continued)

FOREIGN PATENT DOCUMENTS

CN 103779544 A * 5/2014 ............ H01M 4/139
CN 103779544 B 4/2016
(Continued)

OTHER PUBLICATIONS

European Search Report dated Mar. 21, 2024.
(Continued)

*Primary Examiner* — Jimmy Vo
(74) *Attorney, Agent, or Firm* — Lee IP Law, PC

(57) ABSTRACT

A negative active material for a rechargeable lithium battery, having a core including porous silicon and about 1 wt % to about 12 wt % based on 100 wt % of a total weight of the negative active material of magnesium and a carbon layer on a surface of the core, to more effectively inhibit the expansion of the negative electrode and thereby more effectively inhibit the expansion of the secondary battery.

17 Claims, 7 Drawing Sheets
(1 of 7 Drawing Sheet(s) Filed in Color)

(51) Int. Cl.
*H01M 4/485* (2010.01)
*H01M 4/583* (2010.01)
*H01M 4/02* (2006.01)

(52) U.S. Cl.
CPC .. *H01M 2004/027* (2013.01); *H01M 2220/30* (2013.01)

(56) References Cited

U.S. PATENT DOCUMENTS

| | | | |
|---|---|---|---|
| 2020/0058929 A1 | 2/2020 | Chae et al. | |
| 2020/0350571 A1* | 11/2020 | Lee | H01M 4/386 |
| 2020/0388833 A1 | 12/2020 | Lee et al. | |
| 2021/0184204 A1 | 6/2021 | Oh | |
| 2022/0209228 A1 | 6/2022 | Oh et al. | |
| 2023/0078236 A1 | 3/2023 | Lee et al. | |
| 2023/0352665 A1 | 11/2023 | Park et al. | |
| 2024/0010503 A1 | 1/2024 | Lee et al. | |

FOREIGN PATENT DOCUMENTS

| | | | | | |
|---|---|---|---|---|---|
| CN | 107275587 | A | | 10/2017 | |
| CN | 111244414 | A | * | 6/2020 | B82Y 40/00 |
| KR | 10-2015-0050168 | A | | 5/2015 | |
| KR | 10-2019-0065182 | A | | 6/2019 | |
| KR | 10-1999191 | B1 | | 7/2019 | |
| KR | 10-2019-0104895 | A | | 9/2019 | |
| KR | 10-2022891 | B1 | | 9/2019 | |
| KR | 10-2020-0126344 | A | | 11/2020 | |
| KR | 10-2261504 | B1 | | 6/2021 | |
| KR | 10-2290961 | B1 | | 8/2021 | |
| KR | 10-2021-0149970 | A | | 12/2021 | |
| KR | 2021149970 | A | * | 12/2021 | C01B 32/198 |
| KR | 10-2022-0040580 | A | | 3/2022 | |
| KR | 2022040580 | A | * | 3/2022 | C01B 33/10 |
| KR | 10-2022-0067595 | A | | 5/2022 | |
| KR | 2022067595 | A | * | 5/2022 | C01B 33/02 |
| KR | 10-2023-0037376 | A | | 3/2023 | |
| WO | WO 2022/103053 | A1 | | 5/2022 | |

OTHER PUBLICATIONS

Zhang, Yaguang, et al., "Porous silicon in carbon cages as high-performance lithium-ion battery anode Materials", Electrochimica Acta, 2017, vol. 252, pp. 438-445.
Korean Office action dated May 22, 2025.
KR Decision of Rejection dated Mar. 19, 2026, of the corresponding Korean Patent Application No. 10-2022-0145307.

* cited by examiner

NEGATIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2022-0145307 filed in the Korean Intellectual Property Office on Nov. 3, 2022, the entire contents of which are incorporated herein by reference.

BACKGROUND

1. Field

Embodiments of the present disclosure relate to a negative active material for a rechargeable lithium battery and a rechargeable lithium battery including the same.

2. Description of the Related Art

Electric vehicle and ESS (energy storage system) market expansion requires high-capacity and high efficiency batteries. Studies for using a silicon-based material as a negative active material of the battery have been undertaken.

The silicon-based negative active material has advantages related to exhibiting high-capacity and high efficiency, but has shortcomings related to volume expansion during charge and discharge. To overcome these shortcomings, attempts have been made to use a composite material with a carbon matrix, or a silicon oxide or a silicon alloy.

SUMMARY

Embodiments are directed to a negative active material for a rechargeable lithium battery, having a core including porous silicon and about 1 wt % to about 12 wt % based on 100 wt % of a total weight of the negative active material of magnesium and a carbon layer on a surface of the core.

The negative active material for a rechargeable lithium battery wherein magnesium may be about 1 wt % to about 10 wt % of 100 wt % of the total weight of the negative active material.

The negative active material for a rechargeable lithium battery wherein magnesium may be about 3 wt % to about 10 wt % based on 100 wt % of the total weight of the negative active material.

The negative active material for a rechargeable lithium wherein the magnesium may be included in the negative active material as a $MgSiO_3$ compound.

The negative active material wherein the carbon layer may include an amorphous carbon.

The negative active material for a rechargeable lithium battery wherein the amorphous carbon may include soft carbon, hard carbon, or combinations thereof.

The negative active material for a rechargeable lithium battery wherein the carbon layer may be about 5 wt % to about 45 wt % based on 100 wt % of the total amount of the negative active material.

The negative active material for a rechargeable lithium battery wherein the porous silicon includes pores may have an average size of about 50 nm or more.

The negative active material for a rechargeable lithium battery wherein the pores may have an average size of about 50 nm to about 500 nm.

The negative active material for a rechargeable lithium battery wherein the negative active material may be prepared by primary heat-treating magnesium silicide to prepare a heat-treated product, etching the heat-treated product to prepare a porous silicon, mixing the porous silicon with an amorphous carbon precursor to prepare a mixture, and secondary heat-treating the mixture.

The negative active material for a rechargeable lithium battery wherein the primary heat-treating may be performed under an air atmosphere.

The negative active material for a rechargeable lithium battery wherein the primary heat-treating may be performed at about 600° C. to about 700° C. for about 5 hours to about 30 hours.

The negative active material for a rechargeable lithium battery wherein the etching is performed by using an acid.

The negative active material for a rechargeable lithium battery wherein the acid may be hydrochloric acid.

The negative active material for a rechargeable lithium wherein a mixing ratio of the porous silicon and the amorphous carbon precursor may be about 95:5 to about 55:45 by weight ratio.

The negative active material for a rechargeable lithium battery wherein the secondary heat-treating may be performed at about 800° C. to about 1200° C.

A rechargeable lithium battery including a negative electrode including the negative active material of claim 1, a positive electrode including a positive active material, and a non-aqueous electrolyte.

The rechargeable lithium battery wherein the negative electrode includes the negative active material as a first negative active material and further includes crystalline carbon as a second negative active material.

The rechargeable lithium battery wherein a mixing ratio of the first negative active material and the second negative active material is about 1:99 to about 40:60 by weight ratio.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features will become apparent to those of skill in the art by describing in detail exemplary embodiments with reference to the attached drawings in which.

DETAILED DESCRIPTION

Figure 1:
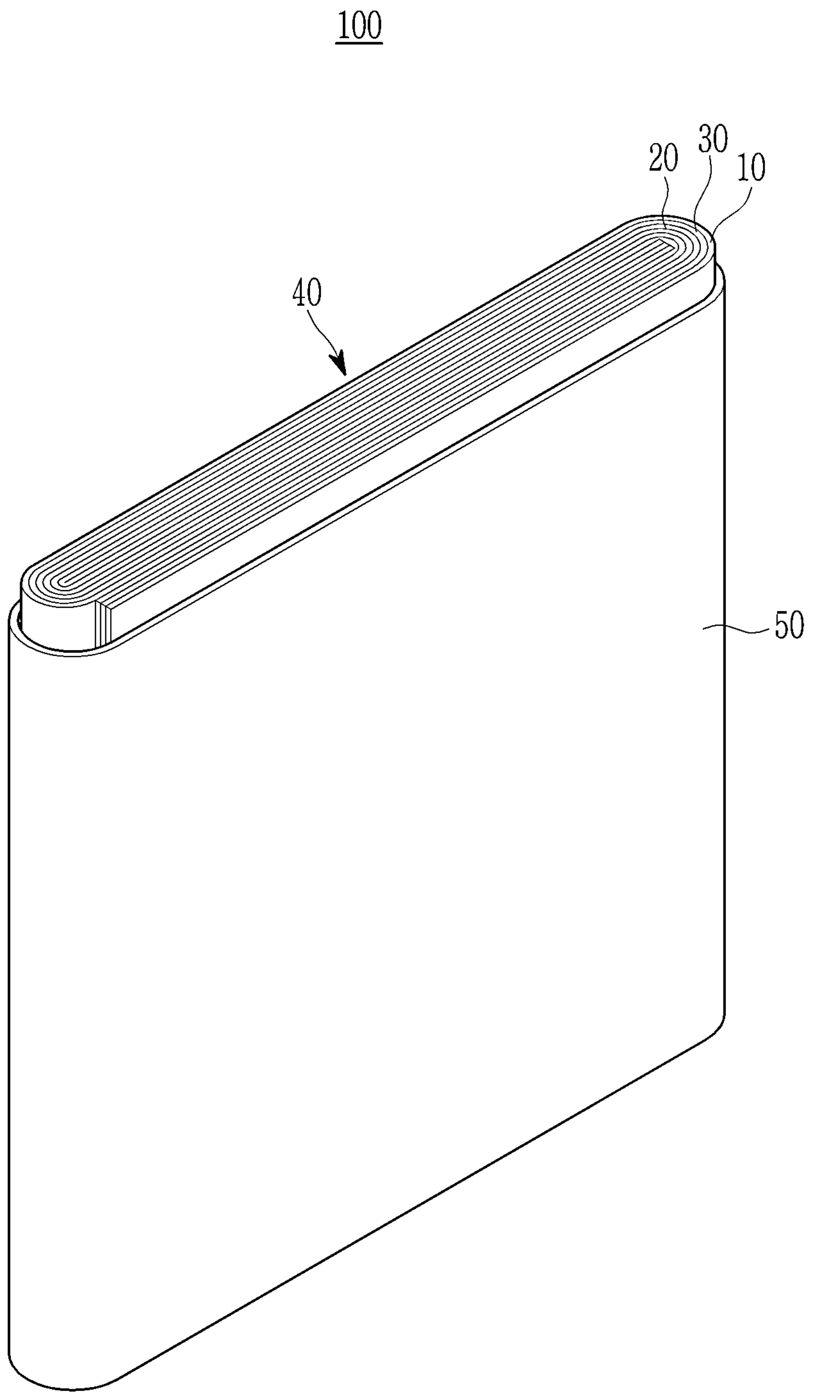
FIG. 1 is a schematic view showing the structure of a rechargeable lithium battery according to an embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the specification, when a definition is not otherwise provided, a particle diameter D50 indicates an average particle diameter D50 where a cumulative volume is about 50 volume % in a particle distribution. The average particle size D50 may be measured by a method well known to those skilled in the art, for example, by a particle size analyzer, or by a transmission electron microscopic image, or a scanning electron microscopic image. In some embodiments, a dynamic light-scattering measurement device is used to perform a data analysis, and the number of particles is counted for each particle size range, and from this, the average particle diameter D50 value may be easily obtained through a calculation.

A negative active material for a rechargeable lithium battery may include a core including porous silicon and magnesium and a carbon layer on the surface of the core. In some embodiments the amount of magnesium may be about 1 wt % to about 12 wt % based on 100 wt % of the total weight of the negative active material, according to other embodiments, the amount of magnesium may be about 1 wt % to about 10 wt % based on 100 wt % of the total weight of the negative active material, or according to still other embodiments, the amount of magnesium may be about 3 wt % to about 10 wt % based on 100 wt % of the total weight of the negative active material.

If the amount of magnesium is within the above ranges, excellent cycle-life characteristics and initial efficiency characteristics may be exhibited. If the amount of magnesium is out of the above ranges, e.g., the amount of magnesium is less than 1 wt %, the effect of the magnesium of preventing silicon oxide from remaining in the active material by reacting with the silicon oxide ($SiO_2$), which may be naturally generated from silicon in air, may be insufficient. If silicon oxide remains, such silicon oxide may react with lithium during the initial charge and discharge to generate an irreversible phase transition ($Li_xSiO_y$), thereby deteriorating initial efficiency. If the amount of magnesium is more than 12 wt %, excessive magnesium may cause an irreversible reaction, thereby decreasing initial efficiency.

In the negative active material, according to some embodiments, magnesium may be present as a $MgSiO_3$ compound and may not be substantially present as a MgO compound. In the negative active material, the presence of magnesium in the form of the $MgSiO_3$ compound is necessary to effectively obtain the desired effects resulting from the inclusion of magnesium. For example, the effect of the magnesium of preventing silicon oxide from remaining in the active material by reacting with silicon oxide ($SiO_2$). If magnesium is present in the form of MgO the charge capacity of the rechargeable lithium battery may be reduced and if magnesium is present in the form of $MigSiN_2$, the rechargeable lithium battery may have no charge capacity as $MgSiN_2$ does not electrochemically react with lithium.

In some embodiments, the carbon may be an amorphous carbon. If the carbon of the carbon layer is an amorphous carbon, it may be uniformly coated on the porous silicon and magnesium core, so that the conductivity may be further enhanced, and power may be excellent, as compared to crystalline carbon. The amount of the amorphous carbon may be about 5 wt % to about 45 wt % based on the total weight of the negative active material. The amorphous carbon may be soft carbon, hard carbon, or a combination thereof.

In some embodiments the negative active material may have pores with an average size of about 50 nm or more, in other embodiments the pores may have an average size of about 50 nm to about 500 nm. In still other embodiments, the pores may have an average size of about 50 nm to about 100 nm. The pores may effectively inhibit the volume expansion of silicon during charging and discharging. This is because the included pores absorb the expanded volume, thereby suppressing the expansion of the total volume of the negative active material. The pores effect of suppressing the volume expansion may be more effectively obtained from a pore average size of about 50 nm or more. In one implementation, the pore size may be measured by, e.g, a nitrogen adsorption method (BJH method), mercury porosimetry, etc.

The active material according to one embodiment may be prepared by the following procedures. First of all, magnesium silicide ($Mg_2Si$) may be oxidized creating an oxidized product. The oxidation converts the magnesium silicide into MgO and Si, and thus, an oxidized product where MgO is intercalated into Si may be prepared. The oxidation may be performed by a primary heat treatment of the $Mg_2Si$ under air. The primary heat treatment may be performed at about 600° C. to about 700° C. The primary heat treatment may be performed for about 5 hours to about 30 hours.

A primary heat treatment at 600° C. to 700° C. under $N_2$ atmosphere does not oxidize magnesium silicide ($Mg_2Si$), which may result in the generation of the combustible silane gas during the subsequent oxide-treatment. The oxidation under the $N_2$ atmosphere requires a high-temperature heat treatment at 900° C. or more, but high temperatures may cause $MgSiN_2$ to form which does not electrochemically react with lithium and does not act as a negative active material.

If the primary heat treatment is performed under $CO_2$ atmosphere, the oxidation requires a primary heat treatment at 650° C. or more which may result in simultaneous deposition of excessive carbon, making it impossible to control the carbon amount. If the amount of carbon is increased, capacity may be reduced. Even if the heat treatment is performed in an air atmosphere, if the heat-treatment is performed at a temperature out of the range, e.g., between about 600° C. to about 700° C., $Mg_2Si$ may remain, and a side-reaction may occur.

Thereafter, the oxidized product may be subjected to an etching using an acid. This procedure may be carried out by immersing the heat-treated product in the acid. In this etching procedure, MgO generated by oxidation may be dissolved in the acid and thereby removed. The etching may be appropriately performed in order to allow some MgO to remain. This may be achieved by controlling a mixing ratio of the oxidized product and the acid. In some embodiments, the mixing ratio of the oxidized product and the acid may be about 43:57 to about 46:54 by weight ratio, or about 44:56 to about 45:55 by weight ratio. In some embodiments, the mixing ratio of the oxidized product and the acid may be about 43:57 to about 46:54 by molar ratio, or about 44:56 to about 45:55 by molar ratio.

If the mixing ratio of the oxidized product and the acid is out of the range, e.g., if the used amount of the acid is extremely small in comparison to the amount of oxidized product, too much MgO may remain, which results in a surprisingly deteriorated capacity of a rechargeable lithium battery using the final negative active material. If too much of the acid is used MgO may be excessively removed. For example, MgO may be virtually completely removed such that the amount left is insufficient to react with $SiO_2$ prepared by the subsequent process, so that the initial efficiency, e.g., of the rechargeable lithium battery, may not be effectively improved.

After etching, a filtration may be performed to obtain an etching product. In the etching product, portions from where MgO was removed may remain as pores, and thus, pores may be formed in the silicon, thereby enabling silicon to exist as a porous silicon. The acid may be a hydrochloric acid.

Thereafter, the etching product may be mixed with an amorphous carbon precursor. The amorphous carbon precursor may be petroleum-based cokes, coal-based cokes, petroleum-based pitch, coal-based pitch, green cokes, or a combination thereof. A mixing ratio of the porous silicon and the amorphous carbon precursor may be about 95:5 to about 55:45 by weight ratio.

As such, the mixing of the etching product and the amorphous carbon precursor may control a generated pore to be a desired size. In some embodiments, if the mixing ratio of the etching product and the amorphous carbon precursor is within the range, an obtained pore size may be controlled to be about 50 nm or more, and according to one embodiment, about 50 nm or more and about 500 nm or less.

The mixture may be secondarily heat-treated to prepare a negative active material. The secondary heat-treatment may be performed at about 800° C. to about 1200° C. According to the secondary heat-treatment, the amorphous carbon precursor may be converted to an amorphous carbon which may be included in the final product, as an amorphous carbon, and the remaining MgO may react with an oxide film ($SiO_2$) of the porous silicon to generate $MgSiO_3$.

Another embodiment provides a rechargeable lithium battery including a negative electrode, a positive electrode, and an electrolyte. The negative electrode may include a current collector and a negative active material layer according to one embodiment on the current collector.

The negative active material layer may further include a crystalline carbon negative active material. The crystalline carbon negative active material may be of unspecified shaped, sheet-shaped, flake-shaped, spherically-shaped, or fiber-shaped natural graphite or artificial graphite.

If the negative active material layer includes the negative active material according to one embodiment as a first negative active material, and crystalline carbon negative active material as a second negative active material, the first negative active material may be positioned between the second negative active material particles to well contact with the second negative active material, thereby more effectively inhibiting the expansion of the negative electrode.

Herein, the mixing ratio of the first negative active material and the second negative active material may be about 1:99 to about 40:60 by weight ratio.

If the first negative active material and the second negative active material are mixed and used in a range, e.g, about 1:99 to about 40:60 by weight ratio, the current density of the negative electrode may be further improved and the thin film electrode may be prepared. In some embodiments, the first active material including silicon in the negative electrode may exist more uniformly, and thus, the negative electrode expansion may be more effectively suppressed.

In the negative active material layer, the amount of the negative active material may be about 95 wt % to about 99 wt % based on the total weight of the negative active material layer.

The negative active material layer may include a binder, and optionally, may further include a conductive material. In the negative active material layer, the amount of the binder may be about 1 wt % to about 5 wt % based on the total weight of the negative active material layer. In other embodiments, if the conductive material is further included, about 90 wt % to about 98 wt % of the negative active material, about 1 wt % to about 5 wt % of the binder, and about 1 wt % to about 5 wt % of the conductive material may be used.

The binder improves binding properties of negative active material particles with one another and with a current collector. The binder may be a non-aqueous binder, an aqueous binder, or a combination thereof.

The non-aqueous binder may be an ethylene propylene copolymer, polyacrylonitrile, polystyrene, polyvinyl chloride, carboxylated polyvinylchloride, polyvinyl fluoride, polyurethane, polytetrafluoroethylene, polyvinylidene fluoride, polyethylene, polypropylene, polyamideimide, polyimide, or combinations thereof.

The aqueous binder may be a styrene-butadiene rubber, an acrylated styrene-butadiene rubber (ABR), an acrylonitrile-butadiene rubber, an acrylic rubber, a butyl rubber, a fluorine rubber, an ethylene oxide-containing polymer, polyvinyl pyrrolidone, polyepichlorohydrin, polyphosphazene, an ethylene propylene diene copolymer, polyvinyl pyridine, chlorosulfonayrf polyethylene, latex, a polyester resin, an acrylic resin, a phenol resin, an epoxy resin, polyvinyl alcohol, or combinations thereof.

If the aqueous binder is used as a negative electrode binder, a cellulose-based compound may be further used to provide viscosity. The cellulose-based compound may include one or more of carboxymethyl cellulose, hydroxypropylmethyl cellulose, methyl cellulose, or alkali metal salts thereof. The alkali metal may be Na, K, or Li. The cellulose-based compound may be included in an amount of about 0.1 parts by weight to about 3 parts by weight based on 100 parts by weight of the negative active material.

The conductive material is included to provide electrode conductivity, and any electrically conductive material may be used as a conductive material unless it causes a chemical change, e.g., it causes a chemical change in the negative active material layer. The conductive material may be a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The positive electrode may include a current collector and a positive active material layer formed on the current collector. The positive electrode active material may include lithiated intercalation compounds that reversibly intercalate and deintercalate lithium ions, specifically, one or more composite oxides of a metal selected from cobalt, manganese, nickel, and combinations thereof, and lithium, may be used. In some embodiments, the compounds represented by one of the following chemical formulae may be used. $Li_aA_{1-b}X_bD^1_2$ ($0.90 \leq a \leq 1.8$, $0 \leq b \leq 0.5$); $Li_aA_{1-b}X_bO_{2-c1}D^1_{c1}$ ($0.90 \leq a \leq 1.8$, $0 \leq b \leq 0.5$, $0 \leq c1 \leq 0.05$); $Li_aE_{1-b}X_bO_{2-c1}D^1_{c1}$ ($0.90 \leq a \leq 1.8$, $0 \leq b \leq 0.5$, $0 \leq c1 \leq 0.05$); $Li_aE_{2-b}X_bO_{4-c1}D^1_{c1}$ ($0.90 \leq a \leq 1.8$, $0 \leq b \leq 0.5$, $0 \leq c1 \leq 0.05$); $Li_aNi_{1-c}Co_bX_cD^1_\alpha$ ($0.90 \leq a \leq 1.8$, $0 \leq b \leq 0.5$, $0 \leq c \leq 0.5$, $0 \leq \alpha \leq 2$); $Li_aNi_{1-c}Co_bX_c$ $O_{2-\alpha}T_{\alpha}$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cD^1_{\alpha}$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cO_{2-\alpha}T_{\alpha}$ ($0.90 \leq a \leq 1.8$, $0 \leq b \leq 0.5$, $0 \leq c \leq 0.5$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.5$, $0 \leq a \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cL^1_dG_eO_2$ ($0.90 \leq a \leq 1.8$, $0 \leq b \leq 0.9$, $0 \leq c \leq 0.5$, $0 \leq d \leq 0.5$, $0 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $Li_aFePO_4$ ($0.90 \leq a \leq 1.8$)

In the above chemical formulae, A is selected from Ni, Co, Mn, or combinations thereof; X is selected from Al, Ni, Co, Mn, Cr, Fe, Mg, Sr, V, a rare earth element, or combinations thereof; $D^1$ is selected from O, F, S, P, or combinations thereof; E is selected from Co, Mn, or combinations thereof; T is selected from F, S, P, or combinations thereof; G is selected from Al, Cr, Mn, Fe, Mg, La, Ce, Sr, V, or combinations thereof; Q is selected from Ti, Mo, Mn, or combinations thereof; Z is selected from Cr, V, Fe, Sc, Y, or combinations thereof; J is selected from V, Cr, Mn, Co, Ni, Cu, or combinations thereof; $L^1$ is selected from Mn, Al, or combinations thereof.

In some embodiments, the compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or mixtures thereof. The coating layer may be disposed in a method having no adverse influence on properties of a positive electrode active material by using these elements in the compound, and for example, the method may include any coating method such as spray coating, dipping, and the like, but is not illustrated in more detail since it is well-known in the related field.

In the positive electrode, a content of the positive active material may be about 90 wt % to about 98 wt % based on the total weight of the positive active material layer. In some embodiments, the positive active material layer may further include a binder and a conductive material. The binder and the conductive material may be included in an amount of about 1 wt % to about 5 wt %, respectively based on the total amount of the positive active material layer.

The binder improves binding properties of positive electrode active material particles with one another and with a current collector. Examples of the binder may be polyvinyl alcohol, carboxymethyl cellulose, hydroxypropyl cellulose, diacetyl cellulose, polyvinyl chloride, carboxylated polyvinylchloride, polyvinyl fluoride, an ethylene oxide-containing polymer, polyvinyl pyrrolidone, polyurethane, polytetrafluoroethylene, polyvinylidene fluoride, polyethylene, polypropylene, styrene-butadiene rubber, an acrylated styrene-butadiene rubber, an epoxy resin, nylon, or the like.

The conductive material is included to provide electrode conductivity, and any electrically conductive material may be used as a conductive material unless it causes a chemical change, e.g., it is chemically reactive with other materials in the positive electrode. Examples of the conductive material may include a carbon-based material such as natural graphite, artificial graphite, carbon black, acetylene black, ketjen black, a carbon fiber and the like; a metal-based material of a metal powder or a metal fiber including copper, nickel, aluminum, silver, and the like; a conductive polymer such as a polyphenylene derivative; or mixtures thereof. The current collector may use aluminum foil, nickel foil, or a combination thereof.

The positive active material layer and the negative active material layer may be prepared by mixing an active material, a binder and optionally, a conductive material in a solvent to prepare an active material composition and coating the active material composition on a current collector. Such the active material layer preparation will be known in the related arts and the detailed description is omitted in the specification. The solvent may be N-methyl pyrrolidone. Furthermore, if the aqueous binder is used in the negative active material layer, the solvent may be water as used in the negative active material composition preparation.

The electrolyte includes a non-aqueous organic solvent and a lithium salt. The non-aqueous organic solvent may serve as a medium for transmitting ions taking part in the electrochemical reaction of a battery. The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethyl acetate, methyl propionate, ethyl propionate, propyl propionate, decanolide, mevalonolactone, caprolactone, or the like. The ether-based solvent may include dibutyl ether, tetraglyme, diglyme, dimethoxyethane, 2-methyltetrahydrofuran, tetrahydrofuran, or the like. The ketone-based solvent may include cyclohexanone, or the like. The alcohol-based solvent may include ethanol, isopropyl alcohol, or the like, and examples of the aprotic solvent may include nitriles such as R—CN (where R is a C2 to C20 linear, branched, or cyclic hydrocarbon, and may include a double bond, an aromatic ring, or an ether bond), amides such as dimethylformamide, dioxolanes such as 1,3-dioxolane, sulfolanes, or the like.

The organic solvent may be used alone or in mixtures. If the organic solvent is used in a mixture, the mixture ratio may be controlled in accordance with a desirable battery performance, and it may be well known to those skilled in the related art.

The carbonate-based solvent may desirably include a mixture with a cyclic carbonate and a linear carbonate. The cyclic carbonate and linear carbonate are mixed together in a volume ratio of about 1:1 to about 1:9, and if the mixture is used as an electrolyte, it may have enhanced performance.

If the non-aqueous organic solvents are mixed and used, a mixed solvent of a cyclic carbonate and a linear carbonate, a mixed solvent of a cyclic carbonate and a propionate-based solvent, or a mixed solvent of a cyclic carbonate, a linear carbonate and a propionate-based solvent may be used. The propionate-based solvent may include methyl propionate, ethyl propionate, propyl propionate, or combinations thereof.

If a mixture of a cyclic carbonate and a linear carbonate, or a mixture of a cyclic carbonate and a propionate-based solvent is used, it may be desirable to use it with a volume ratio of about 1:1 to about 1:9 considering the performances. If a cyclic carbonate, a linear carbonate, and a propionate-based solvent is used it may be mixed and used at a volume ratio of 1:1:1 to 3:3:4. The mixing ratios of the solvents may be appropriately adjusted according to desirable properties.

The non-aqueous organic solvent may further include an aromatic hydrocarbon-based solvent as well as the carbonate-based solvent. The carbonate-based solvent and the aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 1.

[Chemical Formula 1]

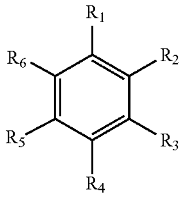

In Chemical Formula 1, $R_1$ to $R_6$ may be the same or different and may each be selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The electrolyte may further include vinylene carbonate, vinylethyl carbonate, or an ethylene carbonate-based compound represented by Chemical Formula 2 as an additive for improving cycle life.

[Chemical Formula 2]

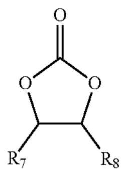

In Chemical Formula 2, $R_7$ and $R_8$ may be the same or different and may each be independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound may be difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, or the like. An amount of the additive for improving the cycle-life characteristics may be used within an appropriate range. The electrolyte may further include vinylethylene carbonate, propane sultone, succinonitrile, or combinations thereof, and the used amount may be suitably controlled.

The lithium salt dissolved in an organic solvent may supply a battery with lithium ions, may basically operate the rechargeable lithium battery, and may improve transportation of the lithium ions between a positive electrode and a negative electrode. Examples of the lithium salt include at least one or two supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y are natural numbers, for example, an integer of 0 to 20, lithium difluoro(bisoxolato) phosphate, LiCl, LiI, $LiB(C_2O_4)_2$ (lithium bis(oxalato) borate: LiBOB), or lithium difluoro(oxalato)borate (LiDFOB). A concentration of the lithium salt may range from about 0.1 M to about 2.0 M. If the lithium salt is included at the above concentration range, an electrolyte may have excellent performance and lithium ion mobility due to optimal electrolyte conductivity and viscosity.

A separator may be between the positive electrode and the negative electrode depending on a type of a rechargeable lithium battery. The separator may use polyethylene, polypropylene, polyvinylidene fluoride or multi-layers thereof having two or more layers and may be a mixed multilayer such as a polyethylene/polypropylene double-layered separator, a polyethylene/polypropylene/polyethylene triple-layered separator, a polypropylene/polyethylene/polypropylene triple-layered separator, and the like.

FIG. 1 is an exploded perspective view of a rechargeable lithium battery according to an embodiment. The rechargeable lithium battery according to some embodiments is illustrated as a prismatic battery and may include variously-shaped batteries such as a cylindrical battery, a pouch battery, and the like.

Referring to FIG. 1, a rechargeable lithium battery 100 according to one embodiment may include an electrode assembly 40 manufactured by winding a separator 30 between a positive electrode 10 and a negative electrode 20 and a case 50 housing the electrode assembly 40. An electrolyte (not shown) may be impregnated in the positive electrode 10, the negative electrode 20 and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

Magnesium silicide ($Mg_2Si$) was primary heat-treated at 610° C. for 20 hours under an air atmosphere.

The primary heat-treated product was mixed with hydrochloric acid at a weight ratio of 43:57 (molar ratio of 43.2:56.8) for etching, thereby preparing an etching product.

The prepared etching product was mixed with petroleum pitch as an amorphous carbon precursor at a weight ratio of 70:30.

The resulting mixture was secondary heat-treated at 950° C. to prepare a negative active material. The produced negative active material had a core including a porous silicon, in which pores with an average size of 50 nm were formed, and $MgSiO_3$, and a soft carbon coating on the surface of the core. The pore size was measured by a mercury pore measurement.

The negative active material was used as a first negative active material, and natural graphite was used as a second negative active material. The first negative active material, the second negative active material, a styrene butadiene rubber binder, and carboxymethyl cellulose, as a thickener, were mixed at a 12:85.5:1.5:1.0 weight ratio in a water solvent to prepare a negative active material slurry. The mixing ratio of the styrene butadiene rubber binder and the carboxymethyl cellulose thickener was at a 60:40 by weight ratio.

The negative active material slurry was coated on a Cu foil current collector, dried, and pressurized by the general procedure to prepare a negative electrode including the current collector and a negative active material layer formed on the current collector.

Using the negative electrode, a $LiCoO_2$ positive electrode, and an electrolyte a rechargeable lithium cell (full cell) was fabricated. As the electrolyte, 1.5M $LiPF_6$ dissolved in a mixed solvent of ethylene carbonate and ethylmethyl carbonate and dimethyl carbonate (20:10:70 volume ratio) was used.

Example 2

A negative active material was prepared by the same procedure as in Example 1, except that the heat-treated product was mixed with hydrochloric acid at a weight ratio of 43.4:56.6 to produce an etching product. The produced negative active material had a core including porous silicon, in which pores with an average size of 50 nm were formed, and $MgSiO_3$, and a soft carbon coating on the surface of the core.

The negative active material was used to fabricate a negative electrode and a rechargeable lithium cell by the same procedure as in Example 1.

Example 3

A negative active material was prepared by the same procedure as in Example 1, except that the heat-treated product was mixed with hydrochloric acid at a weight ratio of 44:56 to produce an etching product. The produced negative active material had a core including a porous silicon, in which pores with an average size of 50 nm were formed, and $MgSiO_3$, and a soft carbon coating on the surface of the core.

The negative active material was used to fabricate a negative electrode and a rechargeable lithium cell by the same procedure as in Example 1.

Example 4

A negative active material was prepared by the same procedure as in Example 1, except that the heat-treated product was mixed with hydrochloric acid at a weight ratio of 44.5:55.5 to produce an etching product. The produced negative active material had a core including a porous silicon, in which pores with an average size of 50 nm were formed, and $MgSiO_3$, and a soft carbon coating on the surface of the core.

The negative active material was used to fabricate a negative electrode and a rechargeable lithium cell by the same procedure as in Example 1.

Example 5

A negative active material was prepared by the same procedure as in Example 1, except that the heat-treated product was mixed with hydrochloric acid at a weight ratio of 45.3:54.7 to produce an etching product. The produced negative active material had a core including a porous silicon, in which pores with an average size of 50 nm were, formed and $MgSiO_3$, and a soft carbon coating on the surface of the core.

The negative active material was used to fabricate a negative electrode and a rechargeable lithium cell by the same procedure as in Example 1.

Comparative Example 1

A negative active material was prepared by the same procedure as in Example 1, except that the primary heat-treated product was mixed with hydrochloric acid at a weight ratio of 42.7:57.3 to produce an etching product. The produced negative active material had a core including a porous silicon, in which pores with an average size of 50 nm were formed and a soft carbon coating on the surface of the core.

Using the negative electrode, a negative electrode and a lithium cell was fabricated by the same procedure as in Example 1.

Comparative Example 2

A negative active material was prepared by the same procedure as in Example 1, except that the heat-treated product was mixed with hydrochloric acid at a weight ratio of 46.3:53.7 to produce an etching product. The produced negative active material had a core including a porous silicon, in which pores with an average size of 50 nm were formed, and $MgSiO_3$, and a soft carbon coating on the surface of the core.

The negative active material was used to fabricate a negative electrode and a rechargeable lithium cell by the same procedure as in Example 1.

Comparative Example 3

A negative active material was prepared by the same procedure as in Example 1, except that the heat-treated product was mixed with hydrochloric acid at a weight ratio of 47.1:52.9 to produce an etching product. The produced negative active material had a core including a porous silicon, in which pores with an average size of 50 nm were formed, and $MgSiO_3$, and a soft carbon coating on the surface of the core.

The negative active material was used to fabricate a negative electrode and a rechargeable lithium cell by the same procedure as in Example 1.

Comparative Example 4

Magnesium silicide ($Mg_2Si$) was primary heat-treated at 610° C. for 20 hours under an $N_2$ atmosphere. The heat-treated product was not oxidized and maintained its state as $Mg_2Si$, which reacts with hydrochloric acid gas to generate the flammable $SiH_4$ (silane) gas and thus, due to the possibility of the explosion, no further experiments were conducted.

Comparative Example 5

A negative active material was prepared by the same procedure as in Example 1, except that Magnesium silicide ($Mg_2Si$) was primary heat-treated at 610° C. for 20 hours under a $CO_2$ atmosphere. The negative active material was used to fabricate a negative electrode and a rechargeable lithium cell by the same procedure as in Example 1.

Comparative Example 6

Magnesium silicide ($Mg_2Si$) was primary heat-treated at 610° C. for 20 hours under an air atmosphere. The primary heat-treated product was mixed with petroleum pitch as an amorphous carbon precursor at a weight ratio of 1.5:98.5, and then the mixture was secondary heat-treated at 950° C. to prepare a negative active material. An etching using hydrochloric acid was not performed.

The negative active material was used to fabricate a negative electrode and a rechargeable lithium cell by the same procedure as in Example 1.

Comparative Example 7

Magnesium silicide ($Mg_2Si$) was primarily heat-treated at 610° C. for 20 hours under an air atmosphere.

The primary heat-treated product was mixed with petroleum pitch as an amorphous carbon precursor at a weight ratio of 16.3:83.7, and then the mixture was secondary heat-treated at 950° C. to prepare a negative active material. An etching using hydrochloric acid was not performed.

The negative active material was used to fabricate a negative electrode and a rechargeable lithium cell by the same procedure as in Example 1.

Comparative Example 8

20 kg of silicon powders with an average particle size of 20 μm, 50 kg of silicon dioxide powders with an average particle size of 20 nm, and 130 kg of silicon oxide powders ($SiO_x$, x=1.03) with an average particle size of 200 μm were agitated using a henschel mixer for 2 hours to uniformly mix, thereby preparing a source powder mixture. The source powder mixture was secondarily heat-treated at 1000° C. for 2 hours under an argon atmosphere.

16 kg of metal magnesium and the heat-treated source powder mixture were respectively injected into a crucible-A and a crucible-B of a vacuum reactor. Pressure was reduced to 0.1 torr, the crucibles were heated, thereby increasing a temperature of the crucible-A including the source powder mixture to 1450° C. to evaporate and increasing a temperature of the crucible-B including metal magnesium to 850° C. to evaporate. Thereafter, the reaction was performed for 5 hours under a vapor state. A water-cooled substrate was used to rapidly cool the silicon composite oxide lump deposited on a substrate inside the reactor to room temperature, e.g., about 20-22° C.

The silicon composite oxide lump was mechanically pulverized for particle size control to achieve an average particle diameter of 6 μm.

50 g of the pulverized silicon composite oxide powder was put inside the tube-type electric furnace, while flowing Ar and methane gas respectively at 1 L/min. The temperature was maintained at 1000° C. for 1 hour, thereby preparing silicon composite oxide-carbon composite powder coated with carbon on the surface, a Mg8-$SiO_x$/C negative active material.

The negative active material was used to fabricate a negative electrode and a rechargeable lithium cell by the same procedure as in Example 1.

Comparative Example 9

8 kg of silicon powders with an average particle size of 20 μm and 16 kg of silicon dioxide powders with an average particle size of 20 nm were added to 50 kg of water, stirred for 12 hours to uniformly mix, and then dried at 200° C. for 24 hours, thereby preparing a source powder mixture.

The source powder mixture and 2 kg of metal magnesium were respectively injected into crucible-A and crucible-B of a vacuum reactor. The pressure was reduced to reach 0.1 torr, and then crucible-A was heated to 1500° C. and crucible-B was heated to 900° C., followed by reacting them for 5 hours. A water-cooled substrate was used to rapidly cool the silicon composite oxide lump deposited on the substrate inside the reactor to room temperature, e.g., about 20-22° C.

The silicon composite oxide lump was mechanically pulverized for particle size control to achieve an average particle diameter of 6 μm.

50 g of the pulverized silicon composite oxide powder was put inside the tube-type electric furnace, and, while flowing Ar and a methane gas respectively at 1 L/min, the temperature was maintained at 900° C. for 1 hour, thereby preparing a negative active material in which the surface of a silicon composite oxide powder was coated with carbon.

Comparative Example 10

100 g of SiO with an average a particle diameter D50 of 6 μm was mixed with 10 g of magnesium powder with an average particle diameter D50 of 10 μm to prepare a first mixture. Thereafter, the first mixture was placed into a chamber and a primary heat-treatment was performed by heating at 950° C. for 2 hours.

100 g of the primary heat-treated particles and 6 g of lithium powders with an average particle diameter D50 of 5 μm were mixed to prepare a second mixture. The second mixture was then injected into a chamber and was secondary heat-treated by heating at 750° C. for 2 hours to prepare a negative active material.

The negative active material was used to fabricate a negative electrode and a rechargeable lithium cell by the same procedure as in Example 1.

(Experimental Example 1) Evaluation of the Amount of Magnesium

The amounts of magnesium included in the negative active materials according to Example 1 to 5 and the Comparative Example 1 to 3, and 5 to 10 were measured by an ICP analysis method. The results are shown in Table 1.

(Experimental Example 2) Evaluation of Initial Capacity

The cells of Examples 1 to 5 and Comparative Examples 1 to 3, and 5 to 10 were formation charged and discharged at 0.1 C once to measure charge capacity. The results are shown in Table 1, as an initial capacity. From the measured formation charge and discharge capacity, the initial efficiency (discharge capacity/charge capacity) was calculated. The results are shown in Table 1.

TABLE 1

| | Amount of Mg (wt %) | Initial capacity (mAh/g) | Initial efficiency (%) |
|---|---|---|---|
| Comparative Example 1 | 0 | 2455.4 | 88.6 |
| Example 1 | 1 | 2353.5 | 89.1 |
| Example 2 | 3 | 2271 | 90.1 |
| Example 3 | 5 | 2131.0 | 89.9 |
| Example 4 | 7 | 2040 | 89.3 |
| Example 5 | 10 | 1981.2 | 88.7 |
| Comparative Example 2 | 13.4 | 1758.9 | 88.6 |
| Comparative Example 3 | 16.4 | 1568.0 | 87.9 |
| Comparative Example 5 | 1 | 1754.7 | 88.1 |
| Comparative Example 6 | 1 | 264 | 70.0 |
| Comparative Example 7 | 10 | 390 | 69.7 |
| Comparative Example 8 | 8 | 1382 | 82.1 |
| Comparative Example 9 | 11 | 640 | 91 |
| Comparative Example 10 | 1.9 | 460 | 90 |

As shown Table 1, the cells of Examples 1 to 5 using the negative active materials in which the amount of Mg is 1 wt % to 10 wt % exhibited excellent initial capacity and initial efficiency.

Whereas, Comparative Example 1, including no Mg, exhibited good initial capacity, but bad initial efficiency, and Comparative Examples 2 and 3 including Mg at an amount of more than 10 wt % exhibited very low initial capacity and slightly deteriorated initial efficiency.

Comparative Example 5 which was heat-treated under a $CO_2$ atmosphere, exhibited good initial capacity, but bad or low initial efficiency, due to the increased carbon amount due to $CO_2$.

Comparative Examples 6 to 7 of which the structure was not porous exhibited significantly decreased in both initial capacity and initial efficiency.

Comparative Examples 8 to 10 using silicon dioxide exhibited extremely decreased initial capacity.

Figure 2:
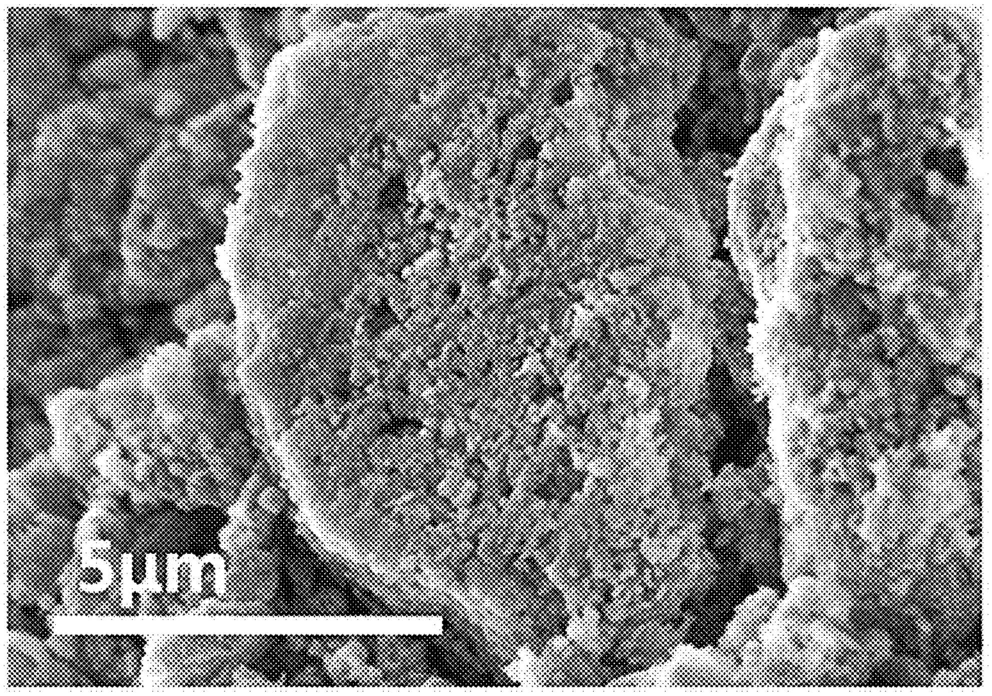
FIG. 2 is a SEM image of the surface of the negative active material of Example 1.
Figure 3:
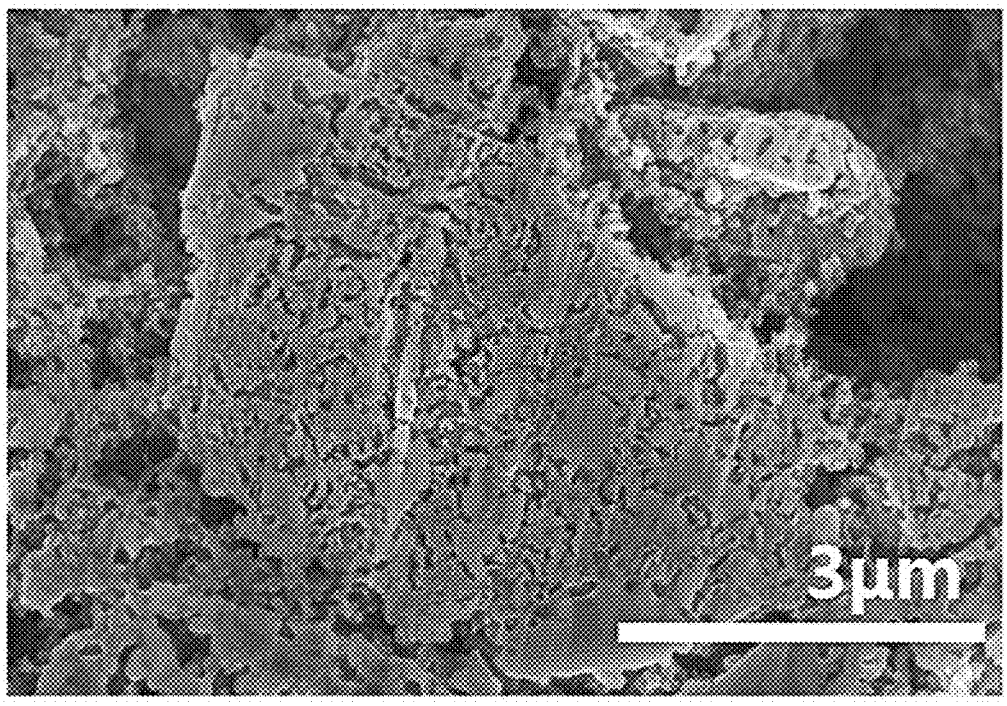
FIG. 3 is a SEM image of the cross-sections of the negative active material of Example 1.
Figure 4:
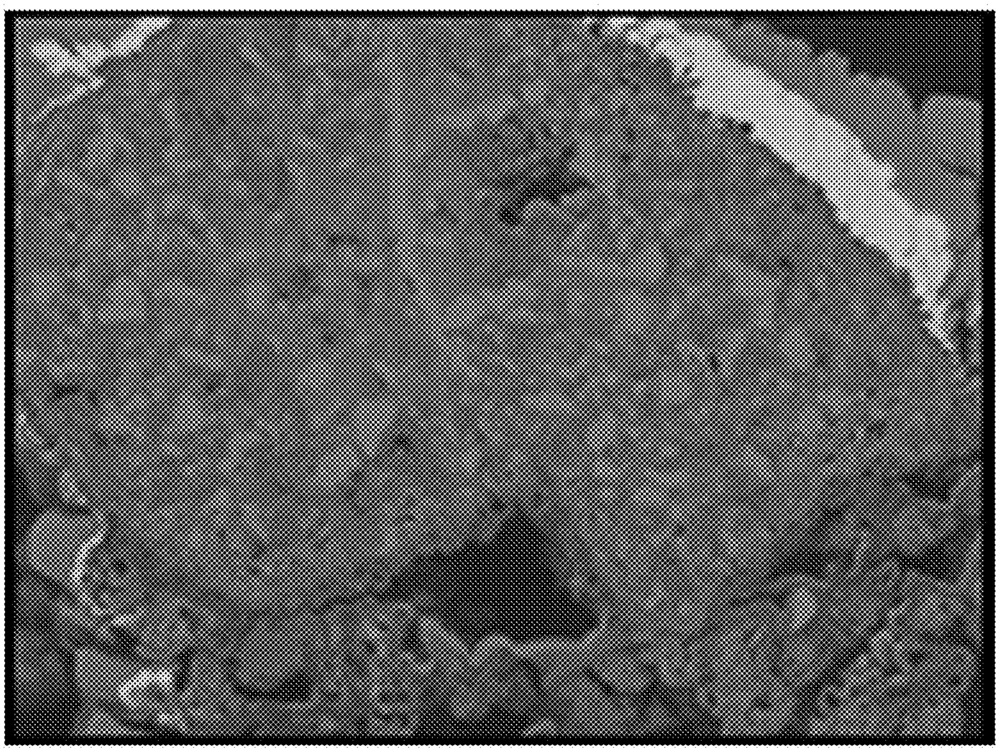
FIG. 4 is a SEM image of the cross-sections of the negative active material of Comparative Example 5.

(Experimental Example 3) Evaluation of SEM and Measurements of Porosity and Expansion Rate The SEM images of the surface of the negative active material of Example 1 are shown in FIG. 2, and the SEM image of the cross-section thereof is shown in FIG. 3. The SEM image of the surface of the negative active material of Comparative Example 5 is shown in FIG. 4.

It can be seen from FIG. 2 and FIG. 3 that the negative active material of Example 1 had a porous structure with pores. Meanwhile, the negative active material of Comparative Example 5 had non-porous structure without pores.

The presence or the absence of negative active materials, e.g., the quantity of pores, of Example 1 and Comparative Example 6 can be clearly seen from the porosity results obtained by measuring using the mercury porosity measurements, because the porosity results were 40.95% in Example 1 and 1.29% in Comparative Example 6.

The rechargeable lithium cells of Example 1 and Comparative Example 6 were charged and discharged at 0.1 C for 700 minutes. The ratio (expansion rate) of the cell thickness as the repeated charge and discharge relative to the cell thickness before charge and discharge were measured. The results were approximately 20% in Example 1 and about approximately 54% in Comparative Example 6.

(Experimental Example 4) Evaluation of XRD

Figure 5:
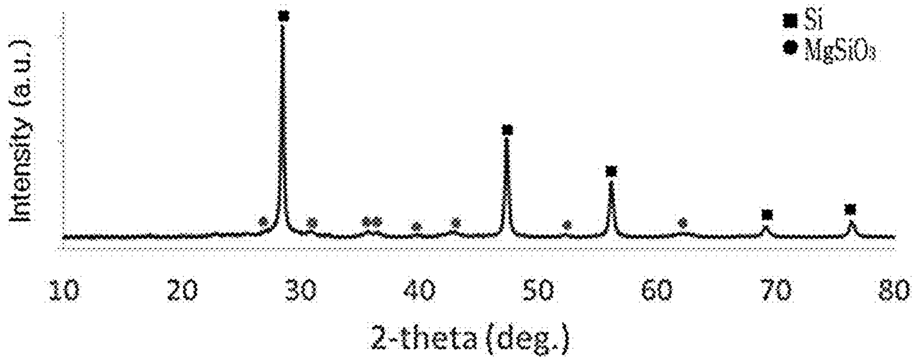
FIG. 5 is a graph showing an XRD result of the negative active material of Example 1.

The X-ray diffraction peak intensity of the negative active material of Example 1 was measured by using a CuKα-ray. The result is shown in FIG. 5. FIG. 5 shows that Si and $MgSiO_3$ are present in the negative active material.

(Experimental Example 5) EDS (Energy Dispersive x-Ray Spectroscopy) Analysis

The negative active material of Example 1 was cross-sectionally cut using a FIB (focused Ion Beam), and energy dispersive x-ray spectroscopy analysis was performed therefor to analyze the cross-section morphology, and the distribution degree of C, 0, Mg, and Si. The results are shown in FIGS. 6 and 7, respectively.

Figure 6:
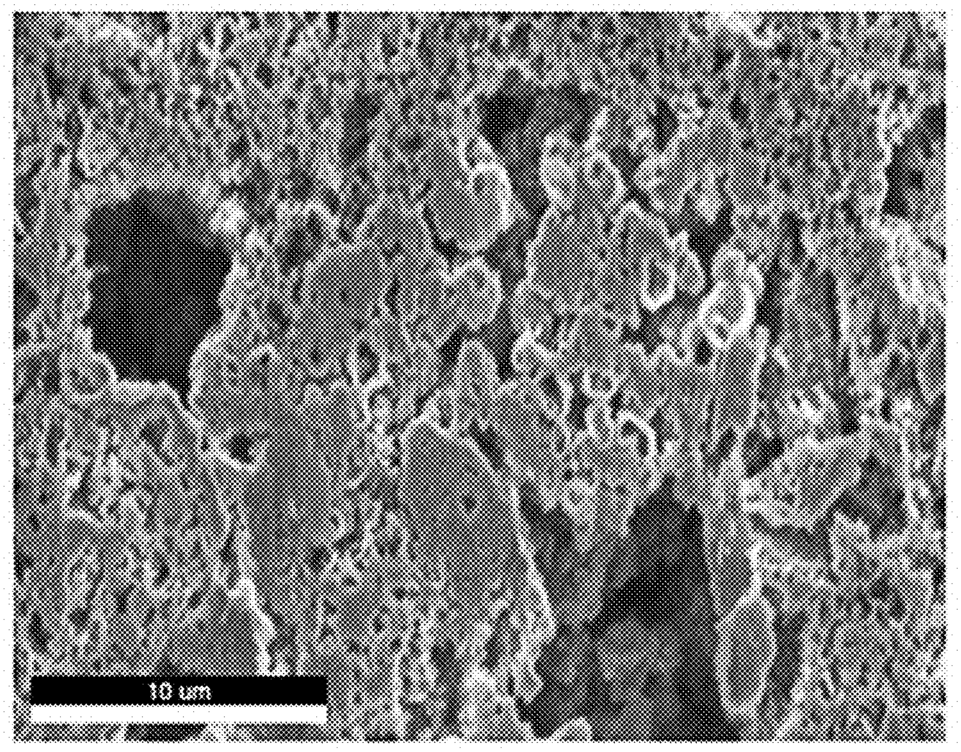
FIG. 6 is an EDS image of the cross-sections of the negative active material of Example 1.
Figure 7:
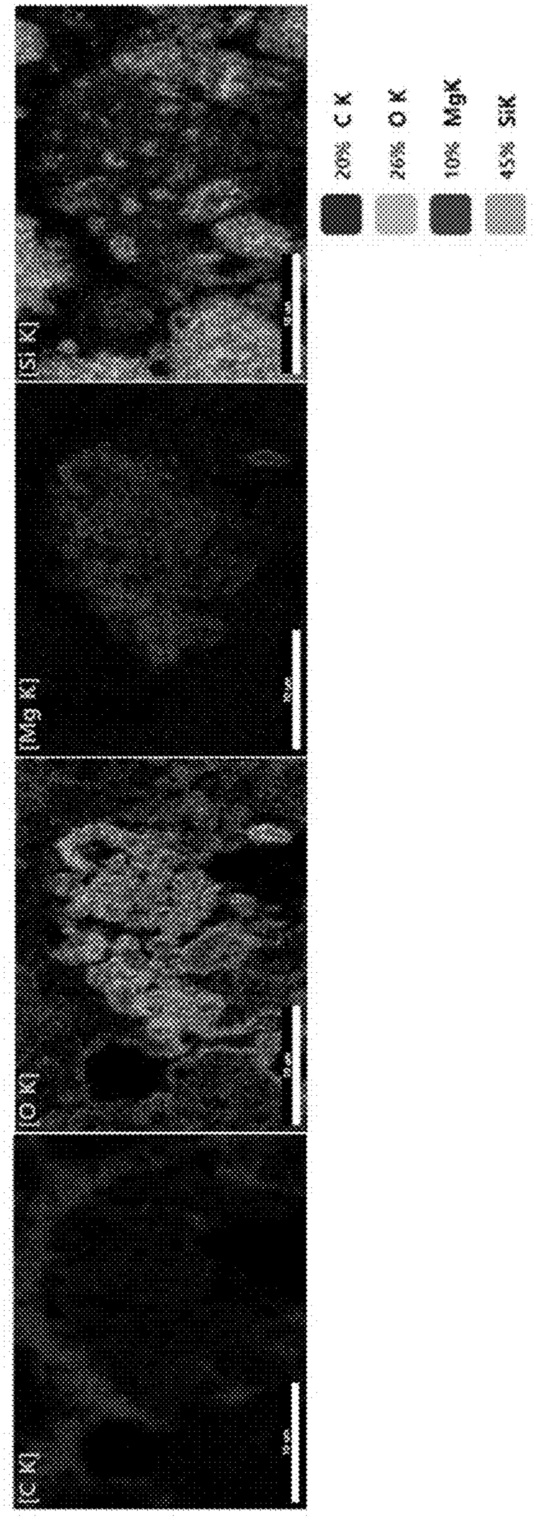
FIG. 7 is an image of the EDS elemental analysis of the negative active material of Example 1.

As shown in FIG. 6 and FIG. 7, the negative active material of Example 1 is well coated with the carbon coating on its surface. Furthermore, from these results in which Mg is simultaneously observed wherever O is observed, it can be ascertained that Mg effectively holds the oxidization layer which may cause a decrease in initial efficiency.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material for a rechargeable lithium battery, comprising:

a core comprising porous silicon and about 1 wt % to about 12 wt % based on 100 wt % of a total weight of the negative active material of magnesium; and a carbon layer on a surface of the core, wherein the porous silicon comprises pores having an average size of about 50 nm to about 100 nm, and wherein the carbon layer comprises an amorphous carbon.

2. The negative active material for a rechargeable lithium battery as claimed in claim 1, wherein magnesium is about 1 wt % to about 10 wt % of 100 wt % of the total weight of the negative active material.

3. The negative active material for a rechargeable lithium battery as claimed in claim 1, wherein magnesium is about 3 wt % to about 10 wt % based on 100 wt % of the total weight of the negative active material.

4. The negative active material for a rechargeable lithium battery as claimed in claim 1, wherein the magnesium is comprised in the negative active material as a $MgSiO_3$ compound.

5. The negative active material for a rechargeable lithium battery as claimed in claim 1, wherein the amorphous carbon comprises soft carbon, hard carbon, or combinations thereof.

6. The negative active material for a rechargeable lithium battery as claimed in claim 1, wherein the carbon layer is about 5 wt % to about 45 wt % based on 100 wt % of the total amount of the negative active material.

7. The negative active material for a rechargeable lithium battery as claimed in claim 1, wherein the negative active material is prepared by primary heat-treating magnesium silicide to prepare a heat-treated product, etching the heat-treated product to prepare a porous silicon, mixing the porous silicon with an amorphous carbon precursor to prepare a mixture, and secondary heat-treating the mixture.

8. The negative active material for a rechargeable lithium battery as claimed in claim 7, wherein the primary heat-treating is performed under an air atmosphere.

9. The negative active material for a rechargeable lithium battery as claimed in claim 7, wherein the primary heat-treating is performed at about 600° C. to about 700° C. for about 5 hours to about 30 hours.

10. The negative active material for a rechargeable lithium battery as claimed in claim 7, wherein the etching is performed by using an acid.

11. The negative active material for a rechargeable lithium battery as claimed in claim 10, wherein the acid is hydrochloric acid.

12. The negative active material for a rechargeable lithium battery as claimed in claim 7, wherein a mixing ratio of the porous silicon and the amorphous carbon precursor is about 95:5 to about 55:45 by weight ratio.

13. The negative active material for a rechargeable lithium battery as claimed in claim 7, wherein the secondary heat-treating is performed at about 800° C. to about 1200° C.

14. A rechargeable lithium battery, comprising:

a negative electrode including the negative active material as claimed in claim 1;

a positive electrode including a positive active material; and a non-aqueous electrolyte.

15. The rechargeable lithium battery as claimed in claim 14, wherein the negative electrode comprises the negative active material as a first negative active material and further comprises crystalline carbon as a second negative active material.

16. The rechargeable lithium battery as claimed in claim 15, wherein a mixing ratio of the first negative active material and the second negative active material is about 1:99 to about 40:60 by weight ratio.

17. The negative active material for a rechargeable lithium battery as claimed in claim 1, wherein:

the magnesium is comprised in the negative active material as a $MgSiO_3$ compound, and the carbon layer is included in an amount of about 5 wt % to about 45 wt %, based on the total amount of the negative active material.

* * * * *